United States Patent

Purdy

[11] 4,193,515
[45] Mar. 18, 1980

[54] LIQUID PROPORTIONING DEVICE WITH INSUFFICIENT SUPPLY AND FLOW VALVES

[76] Inventor: Chester A. Purdy, R.F.D. No. 1, Belmont, Wis. 53510

[21] Appl. No.: 813,535

[22] Filed: Jul. 7, 1977

Related U.S. Application Data

[63] Continuation-in-part of Ser. No. 663,513, Mar. 6, 1976, abandoned.

[51] Int. Cl.² ............................................. B67D 5/34
[52] U.S. Cl. ..................................... 222/57; 141/105; 222/67; 222/386.5; 366/152; 366/162; 366/178
[58] Field of Search ...................... 222/57, 66, 67, 72, 222/94, 133, 134, 145, 68, 95, 386.5; 141/105; 366/152, 162, 178; 137/111, 114, 399, 564.5, 604, 605

[56] References Cited

U.S. PATENT DOCUMENTS

| 1,014,048 | 1/1912 | Byers | 222/57 X |
| 3,084,712 | 4/1963 | Brown | 137/564.5 |
| 3,241,722 | 3/1966 | Nissen | 222/386.5 X |
| 3,406,870 | 10/1968 | Arneson | 222/67 X |
| 3,565,290 | 2/1971 | Prussin et al. | 222/66 X |
| 3,809,291 | 5/1974 | Purdy | 222/145 |

Primary Examiner—Robert J. Spar
Assistant Examiner—Fred A. Silverberg
Attorney, Agent, or Firm—Pearne, Gordon, Sessions

[57] ABSTRACT

A liquid proportioning system is disclosed which operates to mix a liquid concentrate and a liquid diluent in predetermined ratios. The system includes an automatic valve to terminate the flow of concentrate in the event that an insufficient supply of diluent exists. In addition, an anti-siphoning system is disclosed for creating an anti-siphoning air bubble at the upper end of the diluent reservoir and for insuring that such air bubble is not lost in the event of leakage around the filler cap.

20 Claims, 6 Drawing Figures

LIQUID PROPORTIONING DEVICE WITH INSUFFICIENT SUPPLY AND FLOW VALVES

BACKGROUND OF THE INVENTION

This is a continuation-in-part of my copending application Ser. No. 663,513 Mar. 6, 1976 (now abandoned).

This invention relates generally to liquid proportioning systems which operate to mix two liquids in desired ratios, and more particularly, to a novel and improved system of such type incorporating means to prevent improper operation of the system in the event a proper supply of one of the liquids is not present.

PRIOR ART

In the U.S. Pat. No. 3,809,291 dated May 7, 1974, I disclose a system for accurately mixing two liquids in a predetermined ratio. Such system may be used for adding medication or nutrients to the drinking water of livestock, poultry, or the like. In such system, a diluent reservoir is provided and is connected to a supply of drinking water. A concentrate reservoir consisting of a flexible bladder is located within the diluent reservoir so that the concentrate and the diluent are maintained at the same pressure. Orifice metering means connect the two reservoirs to a mixing zone or chamber and operate to accurately regulate the flow from the two reservoirs so that the mixture of the diluent and a concentrate is maintained in a constant predetermined relationship. Such patent is incorporated herein by reference.

In such system, significant problems are not encountered if the supply of concentrate is exhausted, since the drinking water supplied from the system in such an event is not harmful. However, in the event that the supply of drinking water fails for any reason, difficulty is encountered because the concentrate continues to flow into the mixing chamber.

In the copending application Ser. No. 809,456 filed June 23, 1977, an improved system is disclosed and claimed. Such system provides improved proportioning accuracy at very low flow rates even when the concentrate has a substantially higher specific gravity than the diluent. Such system also includes valve means to prevent flow between the concentrate chamber and the mixing chamber during periods of time during which there is no flow through the proportioner. Such copending application is incorporated herein by reference.

SUMMARY OF THE INVENTION

In accordance with the present invention, a novel and improved system is provided to automatically terminate the flow of concentrate in the event that an insufficient diluent supply exists. In addition, an improved antisiphoning structure is provided.

In the illustrated embodiments, the system includes a tank with an internal flexible bladder or bag. The bladder constitutes the concentrate reservoir and the zone within the tank around the bladder constitutes the diluent reservoir. An air zone is provided in the upper portion of the diluent reservoir. Such structure provides positive separation between the two reservoirs, but automatically maintains the pressure of the concentrate, substantially the same as the pressure of the diluent. Mounted adjacent to the lower end of the tank is an orifice system which separates the two reservoirs from a mixing zone or chamber. The orifice system provides at least one orifice open to each of the reservoirs.

Extending into the tank through a top opening is a filler tube, through which concentrate is supplied to the interior of the bladder. In accordance with this invention, such tube extends down through the bladder and is provided with a valving member at its lower end which operates when the tube is in a lowered position to close the orifice or orifices which communicate with the concentrate reservoir to prevent flow out of such reservoir. Float means are provided within the diluent reservoir which operates when sufficient diluent is present in the diluent reservoir for proper system operation to lift the tube and raise the valving member, thus opening the concentrate orifices. Such system allows concentrate flow only when sufficient diluent is present for proper mixing.

In accordance with the first two illustrated embodiments the float means includes a displacement type float mounted on the filler tube above the bladder. Such float operates, when the proper quantity of diluent is present, to lift the filler tube and maintain the concentrate valve in the open position. In another embodiment the float means is provided by air trapped in the top of the bladder. The structure of this last embodiment is arranged so that a substantially predetermined volume of air is entrapped within the bladder each time the concentrate is added to the proportioner to insure the continued presence of the required air for performing the float function.

In addition, in the illustrated embodiment, improved means are included to re-establish an air bubble in the air zone at the top of the tank each time concentrate is added. Further, a tube or conduit extends down along the filler tube to insure that air does not escape, even if leakage occurs at the filler cap. Such air bubble positively prevents siphoning of the concentrate back into the diluent supply system.

DETAILED DESCRIPTION OF THE DRAWINGS

Figure 1:
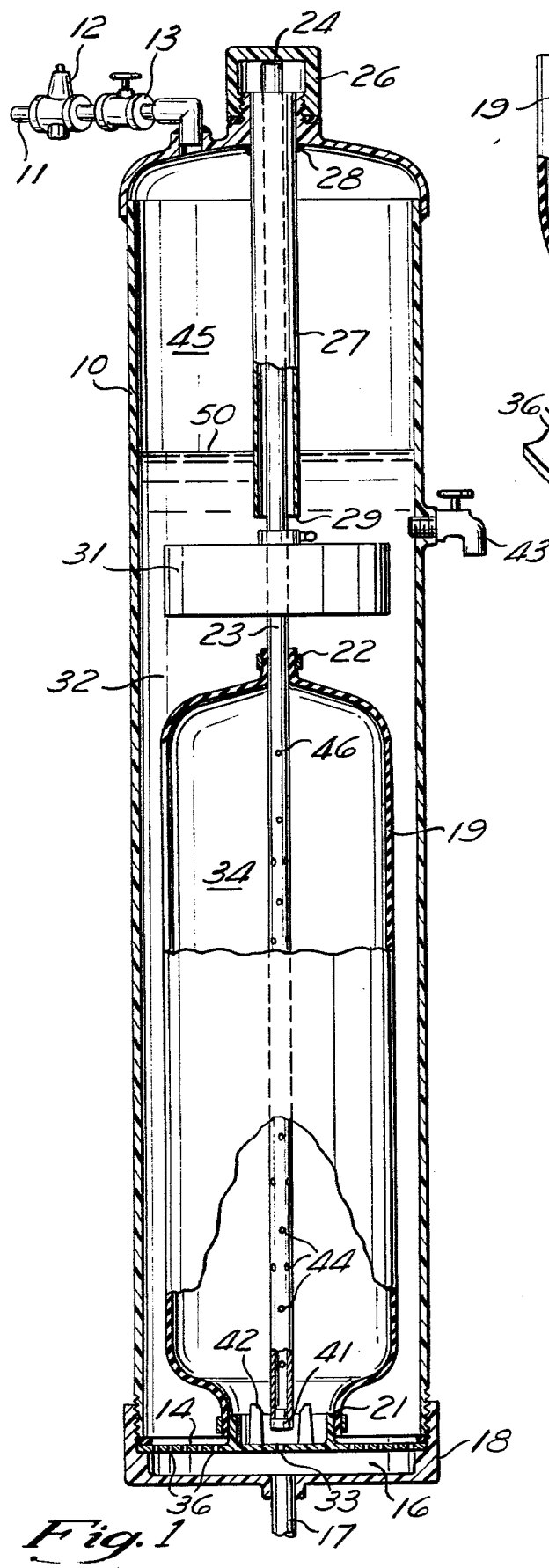
FIG. 1 is a side elevation in longitudinal section illustrating one preferred embodiment of this invention.
Figure 2:
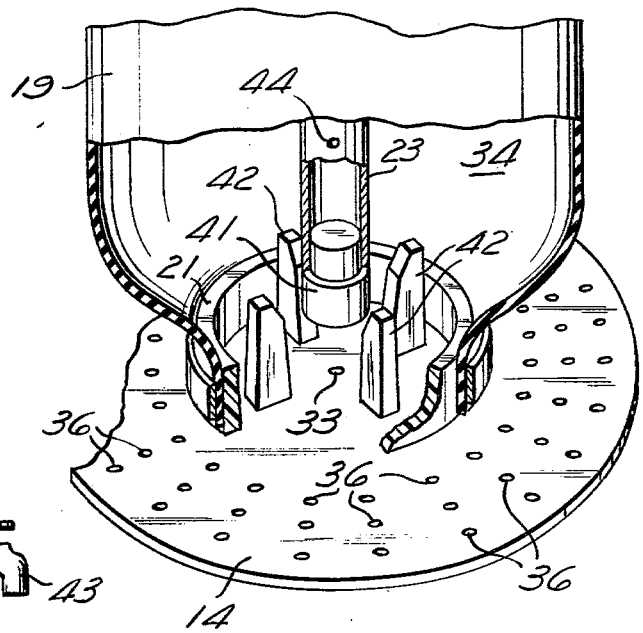
FIG. 2 is an enlarged fragmentary perspective view illustrating the structure of the orifice plate and the valving member of the embodiment of FIG. 1.

FIGS. 1 and 2 illustrate one preferred embodiment of this invention in which the system is pressurized so that it can supply a distribution system which does not require a supplemental pump and which does not depend upon gravity. In this embodiment, a tank 10 is connected to a source of drinking water under pressure 11, through a pressure reducing valve 12 and a shutoff valve 13. The valve 12 functions to limit the supply pressure to insure that excessive pressures do not exist within the tank 10. Such valve 12 may also be constructed to positively prevent back flow. Mounted at the lower end of the tank is an orifice plate 14 of the type described in my patent cited above. Below the orifice plate is a mixing chamber 16, which connects to an outlet pipe 17. Preferably, the orifice plate 14 is secured in position by a threaded cap 18, which also defines in cooperation with the orifice plate, the mixing chamber 16.

Mounted within a tank 10 is a flexible bladder 19 which is clamped at its lower end to a flange 21 formed on the orifice plate and is clamped at its upper end at 22 to the exterior of a filler pipe or tube 23. The filler tube 23 extends upwardly from the bladder 19 to an upper end 24, located within a removable filler cap 26 threaded to the upper end of the tank 10. Positioned around the filler tube 23 is a loosely fitting tube or conduit 27, which is sealed at its upper end at 28 to the tank 10 and extends to an open lower end at 29. Clamped to the filler tube 23 is a float 31 which causes the filler tube to raise up to the position illustrated in FIGS. 1 and 2 when a sufficient supply of diluent or drinking water is contained within the diluent reservoir 32, and also operates to allow the tube to be lowered from the illustrated position when insufficient diluent is present in the reservoir 32.

The orifice plate 14 is provided with a least one orifice 33 open to the concentrate reservoir 34 within the bladder 19 and a plurality of orifices 36 open to the diluent reservoir 32.

As disclosed in my patent cited above, each of the orifices 33 and 36 is the same size and shape so that, at a given pressure, the rate of flow through each orifice is the same. Consequently, the ratio of the number of orifices 33 to the number of orifices 36 is arranged to provide the desired mixing ratio of the concentrate and the diluent. Further, since the pressure of the concentrate within the concentrate reservoir is automatically maintained at the same pressure as the diluent in the diluent reservoir 32, due to the fluid pressure transmitting connection provided by the bladder 19, the desired ratio of concentrate to diluent is maintained by the system.

In the event, however, that the supply of diluent is inadequate to cause the float 31 to lift the filler tube 23 to the illustrated position, the filler tube 23 drops down and causes a valving element 41, carried by the lower end of the filler tube, to engage the orifice 33 and terminate flow from the concentrate reservoir 34. Preferably, the valving element is formed of elastomeric material which fits into the lower end of the filler tube 23 and provides an end surface which seats against the orifice plate to provide a good seal. A plurality of upstanding guides 42 are positioned around the lower end of the filler tube to insure that it remains in the proper position to close off the orifice or orifices 33 in the event that the supply of diluent is not maintained at the proper level.

When it is necessary to replenish the supply of concentrate within the concentrate reservoir, the valve 13 is closed and a valve 43 in the side of the tank is opened to release the pressure within the tank. The filler cap 26 is then removed to provide access to the upper end 24 of the filler tube. A funnel is then inserted in the upper end of the filler tube 24 and concentrate is poured into the concentrate reservoir 34 along the filler tube 23. A plurality of openings 44 are provided in the filler tube 23 so that the concentrate flows from the interior of the filler tube into the concentrate reservoir 34. Preferably the uppermost opening 46 in the filler tube 23 is located a short distance below the upper end of the bladder so that a small bubble of air is trapped in the upper end of the bladder to assist the float 31 in lifting the filler tube.

During the filling of the concentrate bladder 34, the level of the diluent drops down to the level of the valve 43 causing air to be drawn into the upper end of the diluent reservoir along the zone between the filler tube 23 and the tube 27. This insures that an antisiphoning bubble of substantial size is provided within the air zone 45 each time the concentrate is added to the system. When sufficient concentrate is supplied to the concentrate reservoir 34, the filler cap 26 is re-installed, the valve 43 is closed and the valve 13 is opened. As the diluent then flows into the diluent reservoir 32, the air within the upper end thereof is compressed to the supply pressure raising the diluent level to a level illustrated at 50 for example, and the system is re-activated. It should be noted that the diluent level at 50 is above the lower end of the tube 27 so the air in the zone 45 is isolated from the filler cap 26.

The tube 27 performs two functions. First, it prevents the escape of air from the upper end of the diluent reservoir in the event that leakage occurs around the cap 26 to insure that the air bubble is not lost. In the event of leakage, diluent flows up along the tube 27 instead of air and leakage of the diluent is visible to the user to indicate that a proper seal is not provided by the filler cap. The second function of the tube 27 is to engage the upper side of the float 31 and prevent the filler tube from raising up an excessive distance when the cap 26 is removed. This prevents the lower end of the filler tube from moving up out of the guides 42.

The air bubble in the upper end of the diluent reservoir prevents any back siphoning from the system in the event that the supply of water or diluent fails for any reason. Thus, the system cannot cause contamination of the supply of diluent with concentrate. Also, in the event that an insufficient supply of diluent exists within the diluent reservoir 32, the flow of concentrate is automatically terminated when the level of the diluent within the reservoir 32 is insufficient to cause the float 31 to maintain the valving member 41 up away from the orifice 32.

Figure 3:
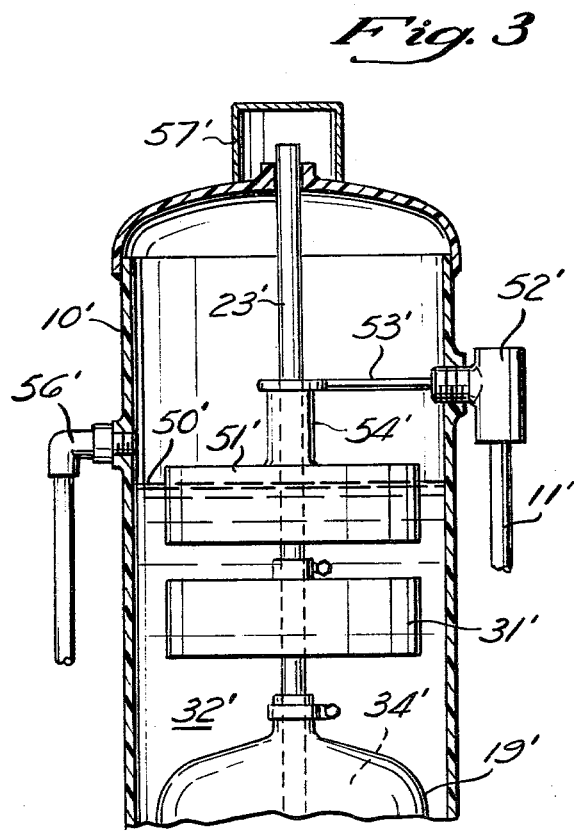
FIG. 3 is a side elevation in longitudinal section of an embodiment in which the tank is not maintained at diluent supply pressure.

FIG. 3 illustrates an embodiment of this invention in which the tank is not maintained under pressure. In this embodiment, similar reference numerals are used to designate similar parts, but a prime is added to indicate that the reference is being made to the second embodiment of FIG. 3. Here again, a tank 10' is provided with a bladder 19' to define a concentrate reservoir 34'. Around the concentrate reservoir 34' is the diluent reservoir 32'. A filler tube 23' extends down along the tank to supply concentrate to the concentrate reservoir. The float 31' operates to raise the tube 23' when sufficient diluent exists within the diluent reservoir 32' so that the orifice communicating with the concentrate reservoir is opened in the same manner as in the first embodiment.

If an insufficient supply of diluent exists, the filler tube 23' drops down and closes off the orifice communicating with the concentrate reservoir in the same manner as in the first embodiment. In this embodiment, however, a second float 51' is provided to control the operation of a float operated valve 52' which is, in turn, connected to the supply of diluent 11'. The filler tube 23' extends up through the float 51' to position the float laterally within the reservoir, but a loose fit is provided so that the float 51' is free to move up and down along the filler tube in response to the level of the diluent in the reservoir 32'. A control arm 53' for the valve 52' extends inwardly and engages at its inner end a collar 54' connected to the float 51'. The valve is arranged so that when the float 51' drops down sensing a lowering of the level of diluent in the reservoir 32', the valve is opened to supply additional diluent to the reservoir. When the float 51' raises up, it causes the valve 52' to close. Consequently, the float system automatically operates to maintain a predetermined level 50' of diluent in the diluent reservoir. Located above the float 51' and at a level above the proper level of diluent within the reservoir 32' is an overflow 56', which may be left open to insure that the level of the diluent within the reservoir does not reach the inlet level of the valve 52'.

In this embodiment the upper end of the filler tube 23' fits through the upper end of the tank with a loose fit and a dust cap 57' is positioned over the upper end of the tube 23' to keep dirt from entering the system. However, since the system is not pressurized, a loose dust cap is utilized. If liquid flows out through the overflow it provides a visual indication of a malfunction of the float control valve 52', since diluent will normally not flow out of the overflow 56' if the float control valve 52' is operating properly.

Figure 4:
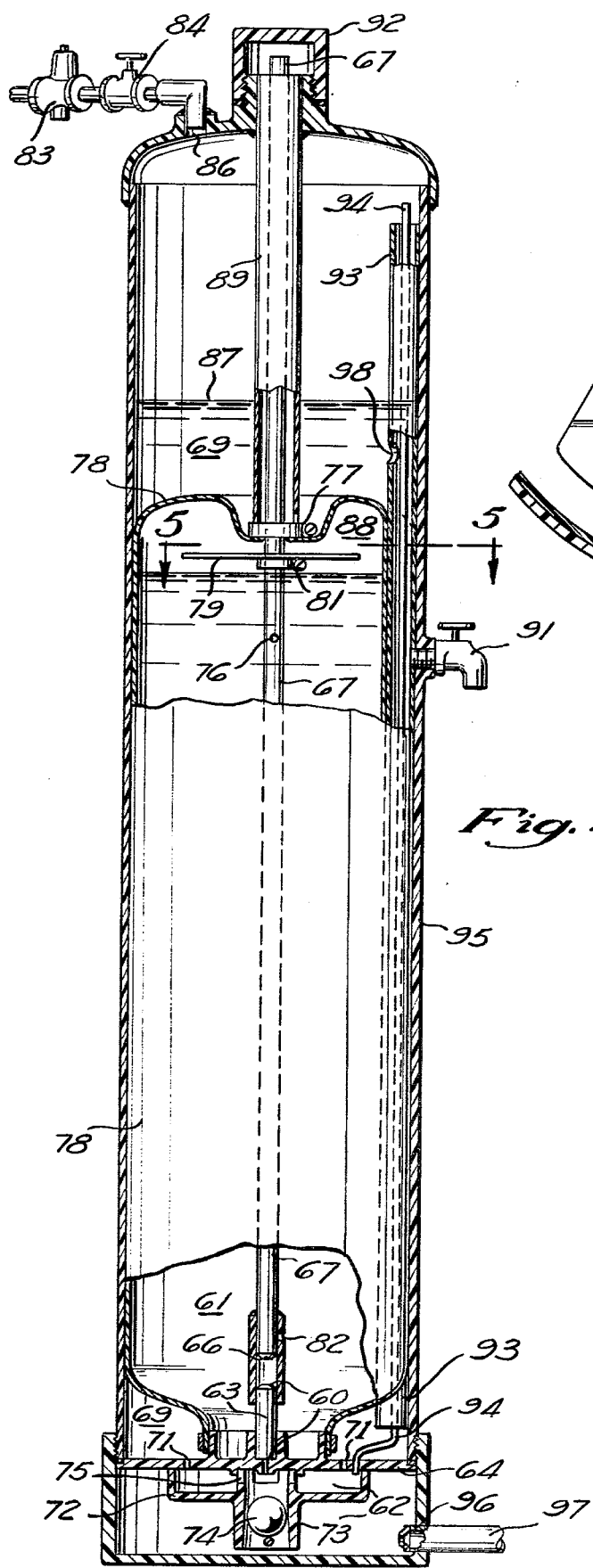
FIG. 4 is a side elevation of an embodiment using entrapped air within the bladder to maintain the concentrate valve open when a sufficient supply of diluent is present.
Figure 5:
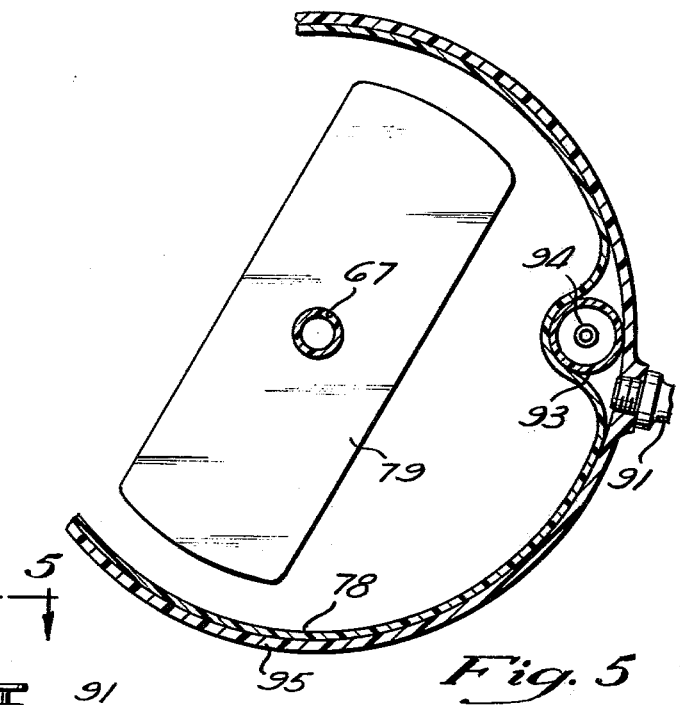
FIG. 5 is an enlarged section taken generally along 5—5 of FIG. 4.
Figure 6:
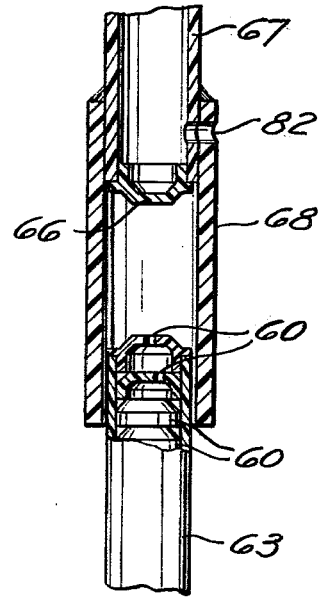
FIG. 6 is an enlarged fragmentary section of the valve structure at the bottom of the filler tube.

FIGS. 4 through 6 illustrate still another embodiment of this invention. In such embodiment a modified metering orifice system is provided in which the concentrate orifice system includes a plurality of series connected orifices 60 connecting the concentrate chamber 61 and the mixing chamber 62. Such series connected orifices 60 are positioned in the stack within an orifice tube 63 which is centrally mounted on the orifice plate 64. The uppermost orifice 60 is mounted at the upper end of the orifice tube 63 so that it can be engaged and closed by an imperforate valve member 66 mounted on the lower end of the filler tube 67.

Mounted on the lower end of the filler tube 67 is a tubular extension 68 which telescopes over the orifice tube 63 with clearance so that concentrate can flow from the concentrate chamber 61 between the two tubes 63 and 68 to the series connected orifices 60 when the filler tube is raised to space the valve member 66 on the uppermost orifice 60. However, when an adequate supply of diluent is not present within the diluent chamber 69 the filler pipe drops down causing the valve member 66 to engage and close the uppermost orifice 60 to prevent continued flow of concentrate.

This embodiment also includes a plurality of diluent orifices 71 through the orifice plate which functions in parallel to connect the diluent chamber 69 and the mixing chamber 62. Such system providing a plurality of the diluent orifices connected in parallel and a plurality of concentrate orifices connected in series provides improved proportioning accuracy at very low flow rates even when the specific gravity of the concentrate is substantially higher than the specific gravity of the diluent. Such orifice combination is described in greater detail in the copending application Ser. No. 809,456 and reference to such application may be made for such more detailed discussion.

Mounted below the orifice plate 64 is a valve cage assembly 72 which in cooperation with the orifice plate 64 defines a portion of the mixing chamber 62. The valve cage assembly 72 includes a tubular valve guide 73 which laterally locates a ball valve 74 formed of a material having a density less than the density of the liquids being proportioned. Such ball valve floats up along the tube 73 to engage and close the lowermost orifice 60 under conditions of no flow through the proportioner. Such ball valve therefore functions to prevent migration of concentrate into the mixing chamber during conditions in which there is no flow through the proportioner and the specific gravity of the concentrate is higher than the specific gravity of the diluent. Conversely, the ball valve also prevents migration of the diluent into the concentrate chamber when no flow is present through the proportioner and the diluent has the higher specific gravity than the specific gravity of the concentrate. The structure is arranged, however, so that the ball valve guide tube 73 is formed with notches 75 in its upper end which communicate between the interior of the tube and the exterior of the tube within the valve cage assembly 72 so that even very small rates of flow cause the ball valve to move down along the ball valve guide tube to open the concentrate orifice system for normal flow as soon as proportioner flow is re-established.

In this embodiment a separate float is not required to raise the filler tube 67 when a proper supply of diluent is present in the diluent chamber. Instead a bubble of air is entrapped in the upper portion of the bladder to provide the float function when an adequate amount of diluent is present. The filler tube of this embodiment is provided with an upper port 76 located a predetermined distance below the clamp 77 which clamps the upper end of the bladder 78 to the filler tube 67. Also mounted on the filler tube within the bladder 78 is a spreader plate 79 secured in position on the filler tube 67 by a clamp 81.

Located at the lower end of the filler tube 67 above the valve member 66 is a second or lower port 82 which extends through both the filler tube 67 and the guide tube 68 to provide communication between the concentrate chamber 61 and the interior of the filler tube at its lower end.

In this embodiment the system is maintained under pressure during normal operation through a pressure regulator 83 and a shutoff valve 84 which opens into the upper portion of the tank through an inlet 86. In normal operation the level of diluent is maintained at a level indicated approximately at 87 above the air bubble 88 located in the upper portion of the bladder. Such air bubble which is entrapped within the bladder in a manner described below functions to exert sufficient lifting force on the filler tube to maintain the filler tube 67 in its raised position to allow normal concentrate flow whenever the level of diluent in the chamber 69 is sufficiently high to immerse the bladder.

However, if for any reason an inadequate supply of diluent is present in the diluent chamber 69 to maintain the upper end of the bladder immersed, the buoyancy of the air bubble 88 is lost and the weight of the tube 67 causes the tube to drop down until the valve member 66 closes off the uppermost orifice 60 of the series connected orifice system. The clamp 77 is located along the length of the filler tube 67 so that it engages the lower end of the outer tube 89 to limit the upward travel of the filler tube so that the orifice tube extends into the tube 68 and functions to laterally position the lower end of the filler tube at all times.

When it becomes necessary to replenish the supply of concentrate the supply valve 84 is closed and a drain valve 91 is open to lower the level of diluent in the diluent chamber 69 to a level approximately in alignment with the upper port 76 in the filler tube. The upper cap 92 is then removed to provide access to the upper end of the filler tube. Because the upper end of the bladder is held out or extended by the spreader plate 79 air is drawn down into the bladder along the filler tube so that the bubble 88 is re-established.

As concentrate is added through the filler tube it flows into the concentrate chamber 61 through the lower port 82 and displaces air within the bladder until the concentrate chamber is filled to the level of the upper port 76. Further, addition of the concentrate causes the upper port 76 to be closed off and prevents the escape of any additional amount of air from the interior of the bladder and consequently a substantially predetermined volume of air is entrapped in the upper end of the bladder each time concentrate is added to the system. This insures that the proper volume of air is always present in the upper end of the bag to provide proper functioning as the float means to open the concentrate valve system and result in a replenished supply of air to the bubble in the event that a portion of the air is dissolved in the concentrate and is carried away with the concentrate during the operation of the proportioner.

After the supply of concentrate is added to the proportioner the cap 92 is replaced the valve 91 is closed and the valve 84 is opened to put the system back into normal operation.

In the embodiment of FIG. 5 two concentric tubes 93 and 94 extend along the wall of the tank. The outer tube 93 provides positive communication between the portion of the diluent chamber 69 above the bladder and the portion thereof immediately above the orifice plate 64. Such tube allows the use of a bladder 78 having a diameter sufficiently large to completely fill the interior of the tank 95 so that a maximum amount of concentrate can be provided within the given proportioner of the given diameter.

The outer tube 93 is provided with a lateral port 98 above the level of the bladder and below the level of the diluent 87 to insure such communication between two portions of the diluent chamber 69 and to insure that the expansion of the bladder into contact with the wall of the tank does not isolate such portions. The inner tube 94 extends through the orifice plate and provides communication between the upper portion of the diluent chamber which is filled with air as discussed above and the mixing chamber so that any air which might otherwise be trapped below the orifice plate at the time the system is initially filled will escape from the lower side of the orifice plate up to the air space above the liquid in the diluent chamber. This insures that all of the orifices discharge into liquid and insures more uniform metering. Preferably a flow restriction 96 is provided in the outlet 97 from the mixing chamber which is sized to limit the flow through the proportioner to a flow rate which will not create sufficient differential pressure across the orifice plate to cause air to be drawn down the vent tube 94 and to thereby insure that the discharge side of the orifices is always maintained full of liquid during normal operation of the proportioner.

With this embodiment of FIG. 4 it is not necessary to provide a separate float to raise the filler tube when an adequate supply of diluent is present.

In all illustrated embodiments, positive means are provided to insure that the concentrate flow is terminated in the event that insufficient diluent is present. Consequently, there is no danger of excessive concentrations of concentrate being supplied from the system. Also, such system prevents the loss of valuable concentrate.

Although preferred embodiments of this invention are illustrated, it is to be understood that various modifications and rearrangements may be resorted to without departing from the scope of the invention disclosed and claimed.

What is claimed is:

1. A liquid proportioning apparatus for dispensing a liquid concentrate diluted with a liquid diluent comprising a diluent reservoir for a supply of diluent, a concentrate reservoir for a supply of concentrate in fluid pressure communication with said diluent, and metering means for receiving diluent from said diluent reservoir and concentrate from said concentrate reservoir and for mixing them in desired porportions, and control means in response to sufficient levels of one of said liquids in said reservoirs to allow continuous dispensing of said liquid concentrate diluted with said liquid diluent in said desired proportions and operable in response to an insufficient level of said one of said liquids within its reservoir to terminate flow of the other of said liquids, said reservoir which contains said other liquid being a flexible container located within the reservoir which contains said one liquid, said metering means includes an orifice open to said other liquid, a filler tube is provided to supply said other liquid to said flexible container, and the lower end of said filler tube operates to engage and close said orifice when said control means responds to an insufficient supply of said one liquid.

2. A liquid porportioning apparatus as set forth in claim 1 wherein said control means includes a float in the reservoir containing said one liquid operably connected to terminate the flow of said other liquid when the level of said one liquid drops to a predetermined level.

3. A liquid proportioning apparatus as set forth in claim 2 wherein said one liquid is said diluent and said other liquid is said concentrate.

4. A liquid porportioning apparatus as set forth in claim 1 wherein said control means includes float means connected to lift said filler tube and maintain said orifice open when a predetermined level of said one liquid is present.

5. A liquid porportioning apparatus as set forth in claim 4 wherein said diluent is supplied to said diluent reservoir through an inlet from a source of diluent under pressure, and said inlet is separated from the diluent in said diluent reservoir by an air filled zone.

6. A liquid proportioning apparatus as set forth in claim 5 wherein a diluent level control valve maintains a substantially predetermined level of diluent in said diluent reservoir.

7. A liquid porportioning apparatus as set forth in claim 1 wherein said diluent is supplied to said diluent reservoir through an inlet from a source of diluent under pressure and said inlet is separated from the diluent in said diluent reservoir by an air filled zone.

8. A liquid proportioning apparatus as set forth in claim 7 wherein means are provided to prevent leakage from said air filled zone.

9. A liquid proportioning apparatus for dispensing liquid concentrate diluted with a liquid diluent comprising a diluent reservoir adapted to be connected to a source of diluent under pressure, a flexible concentrate reservoir within said diluent reservoir, metering means for receiving liquids from said reservoirs and mixing them in desired porportions, closable filler means through which concentrate is added to said concentrate reservoir, said filler means being operable to lower the level of said diluent and allow air to enter an upper air zone within said diluent reservoir when said filler means are open, and isolation means open to said filler means operable to prevent air from escaping from said air zone in the event of leakage of said filler means.

10. A liquid proportioning apparatus as set forth in claim 9 wherein said filler means includes a removable cap and said isolation means includes a conduit opened to said removable cap and extending downwardly therefrom to a location spaced from said removable cap, said conduit isolating said air zone from said removable cap.

11. A liquid proportioning apparatus as set forth in claim 10 wherein a filler tube extends from said concentrate reservoir through said conduit to said removable cap whereby concentrate may be supplied through said filler tube to said concentrate reservoir when said removable cap is removed.

12. A liquid proportioning apparatus for dispensing a liquid concentrate diluted with a liquid diluent comprising a tank, a flexible bladder within said tank defining at least a portion of a first reservoir, said tank in cooperation with said bladder defining at least a portion of a second reservoir, a liquid concentrate in said first reservoir, a liquid diluent in said second reservoir, said flexible bladder operating to maintain said diluent and said concentrate at substantially the same pressure, a mixing chamber separate from said reservoirs, metering means for receiving diluent from said first reservoir and concentrate from said second reservoir and for delivering them to said mixing chamber and mixing them in desired proportions, and control valve means including a float sensitive to the level of said diluent and operable in response to levels of said diluent higher than a predetermined level of said diluent in its reservoir to maintain said valve means open and to allow continuous dispensing of said liquid concentrate diluted with said liquid diluent in said desired proportions, said float being operable in response to levels of said diluent in its reservoir lower than said predetermined level to terminate flow of said concentrate through said valve means.

13. A liquid proportioning apparatus comprising a tank, a flexible bladder within said tank defining a concentrate reservoir, said tank in cooperation with said bladder defining a diluent reservoir exterior of said bladder, a mixing chamber, first orifice means connecting said concentrate reservoir and said mixing chamber, second orifice means connecting said diluent reservoir and said mixing chamber, said first and second orifice means operating when the pressure differential across each of them is substantially equal to deliver a predetermined ratio of concentrate and diluent to said mixing chamber, and valve means operable to terminate flow through at least one of said orifice means when the pressure differential across both of said orifice means is sufficiently unequal to cause inaccurate proportioning.

14. A liquid proportioner as set forth in claim 13 wherein said valve means controls the flow through said first orifice means, and said valve means is maintained opened to allow flow through said first orifice means when the level of liquid in said diluent reservoir is above a predetermined level and to cause said valve means to close and prevent flow through said first orifice means when the level of said diluent is below said predetermined level.

15. A liquid proportioning apparatus as set forth in claim 14 wherein float means are connected to open and close said valve means, said float means including a volume of gas in the top of said bladder.

16. A liquid proportioner as set forth in claim 13 wherein said bladder is sized to expand into contact with the walls of said tank, and a conduit is provided connecting an upper portion of said diluent reservoir above said bladder to a lower portion of said diluent reservoir below said bladder and adjacent to said second orifice means.

17. A liquid proportioning apparatus as set forth in claim 16 wherein said orifice means includes an orifice separating said reservoirs from said mixing chamber, and a second conduit is provided to connect said mixing chamber adjacent to said orifice plate to the upper portions of said tank for conducting air out of said mixing chamber.

18. A liquid proportioning apparatus comprising a tank, a flexible bladder within said tank defining a concentrate reservoir, said tank in cooperation with said bladder defining a diluent reservoir exterior of said bladder, a mixing chamber, first orifice means connecting said concentrate reservoir and said mixing chamber, second orifice means connecting said diluent reservoir and said mixing chamber, said first and second orifice means operating to deliver a predetermined ratio of concentrate and diluent to said mixing chamber, a concentrate filler tube extending through said diluent reservoir into said concentrate reservoir through which concentrate is supplied to said concentrate reservoir, the lower end of said filler tube being provided with valve means operable to close said first orifice means, and float means connected to said filler tube operable to maintain said valve means open to allow continuous flow through said first orifice means when the level of liquid in said diluent reservoir is above a predetermined level and to cause said valve means to close and prevent flow through said first orifice means when the level of diluent is below said predetermined level.

19. A liquid proportioning apparatus as set forth in claim 18 wherein said float means includes air entrapped within the upper portion of said bladder and located below said predetermined level.

20. A liquid proportioning apparatus as set forth in claim 19 wherein means are provided to extend said bladder adjacent the upper end thereof during the filling of said concentrate reservoir, and said filler tube is imperforate for a distance below the upper end of said bladder to insure entrapment of a substantially constant predetermined volume of air within said bladder each time concentrate is added to said concentrate reservoir.

* * * * *